Aug. 31, 1926.

E. A. LOWE 1,597,913

AUTOMATIC FIRE RELEASE FOR SAFE CABINETS

Filed Feb. 5, 1925    5 Sheets-Sheet 1

Inventor
Ernest A. Lowe
By his Attorneys
Townsend + Decker

Aug. 31, 1926.

E. A. LOWE 1,597,913

AUTOMATIC FIRE RELEASE FOR SAFE CABINETS

Filed Feb. 5, 1925 — 5 Sheets-Sheet 2

Inventor
Ernest A. Lowe
By his Attorneys
Townsend & Decker

Aug. 31, 1926.

E. A. LOWE 1,597,913

AUTOMATIC FIRE RELEASE FOR SAFE CABINETS

Filed Feb. 5, 1925  5 Sheets-Sheet 3

Inventor
Ernest A. Lowe
By his Attorneys
Townsend + Decker

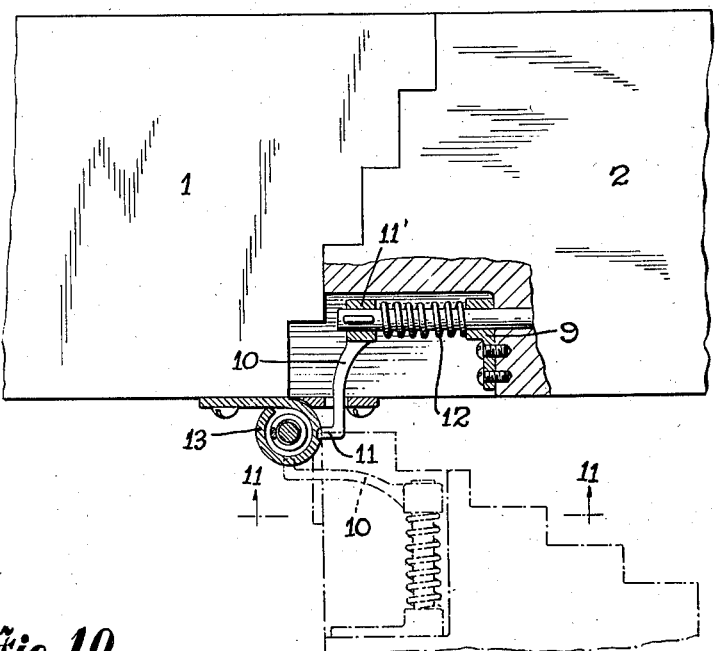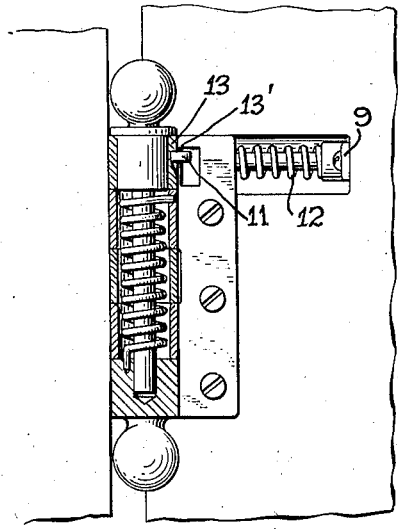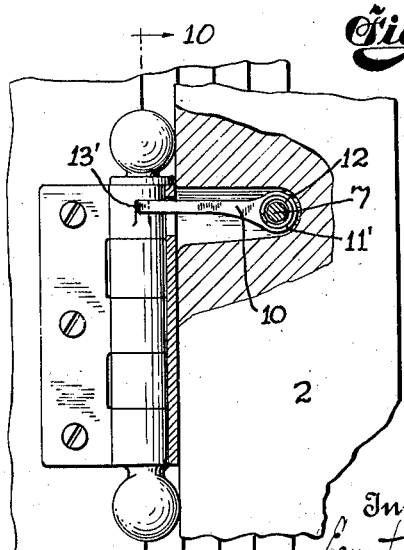

Patented Aug. 31, 1926.

1,597,913

UNITED STATES PATENT OFFICE.

ERNEST A. LOWE, OF PLAINFIELD, NEW JERSEY, ASSIGNOR TO AUTOMATIC SPRINKLER COMPANY OF AMERICA, OF DOVER, DELAWARE, A CORPORATION OF DELAWARE.

AUTOMATIC FIRE RELEASE FOR SAFE CABINETS.

Application filed February 5, 1925. Serial No. 6,935.

My invention relates to means whereby the door of a filing cabinet or other enclosure may be temporarily held open ready to be released for closing under the force of a spring or other means when it is automatically freed from restraint of the holding means by the action of a thermostat.

The object of the invention is to provide an apparatus of great simplicity and effectiveness whereby the operation of the door to close the same may be insured when the temperature rises owing to conditions threatening damage of the contents of the safe by fire if left exposed by retention of the door in open position.

Another object of my invention is to provide means whereby the releasing mechanism may be readily reset in case it should be operated by the action of its controlling thermostat.

Another object of the invention is to provide convenient means whereby when the door is held under restraint by the thermostatically controlled releasing means, it may, through proper manual operation be released and also close independently of any action of the thermostat or of the detent mechanism which is freed or tripped by the thermostat to cause release of the door from the restraint of the dog or catch locking the same against movement.

The invention relates also to special features of construction and combinations of parts whereby the general objects of my invention above recited as well as other special objects are attained all as more particularly hereinafter described in connection with the accompanying drawings and then specified in the claims.

In the accompanying drawings:

Fig. 1 is a top view of a filing cabinet equipped with my invention.

Fig. 2 a front elevation of the same.

Fig. 9 is a partial horizontal section through the door at its hinged edge and through the hinge and shows in plan the end of the rock shaft on the door which carries a dog adapted to interlock with a fixed part to hold the door open.

Fig. 10 is an elevation and partial section on the line 10—10 Fig. 11 of the same parts looking in the direction of the arrows, the door being open.

Fig. 11 is a partial vertical section of the door on the line 11—11 Fig. 9 and through said rock shaft.

Figure 1:
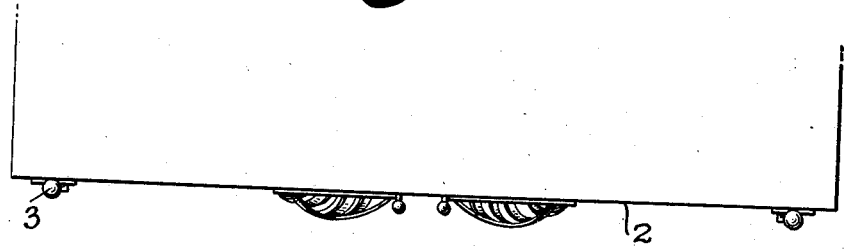

Referring to the drawings:

1 indicates the fixed wall of an enclosure such for instance as a filing cabinet and 2 indicates the door of said cabinet, shown in the present instances as a double door, although one door only might be employed. The hinges upon which said doors swing to open and close the cabinet are indicated at 3; the hinges are preferably spring hinges which apply force tending to close the door. When two doors are employed as shown it is convenient to employ two automatic releasing mechanisms.

The following description of the mechanism employed in connection with one of said doors will suffice for description of the other:

The usual handle and the manually operated lock or latch by which the doors are held closed are indicated at 4.

Figure 3:
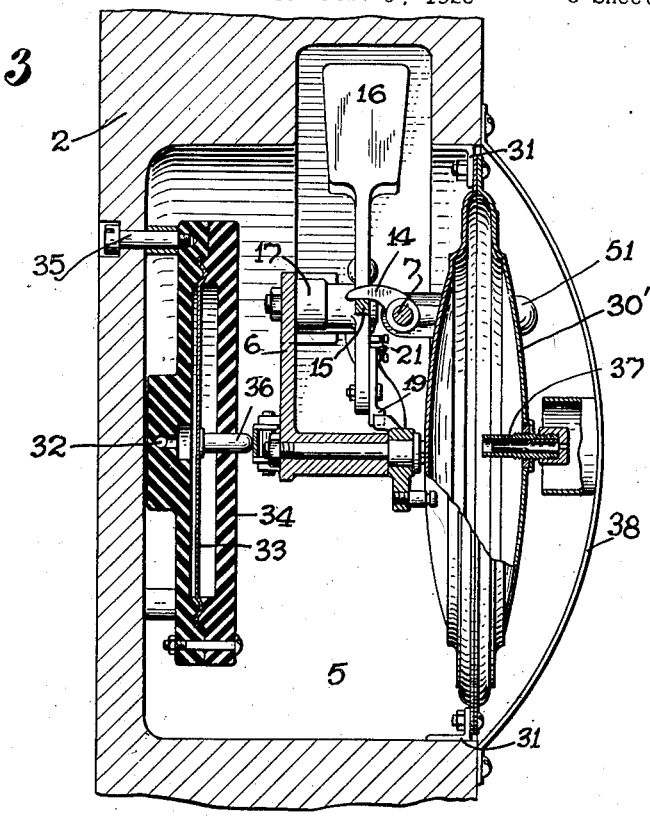
Fig. 3 is a vertical section through the door on the line of the chamber therein which holds the thermostat and trip devices controlled by said thermostat, parts of the contained thermostat and trip devices being shown also in section.
Figure 4:
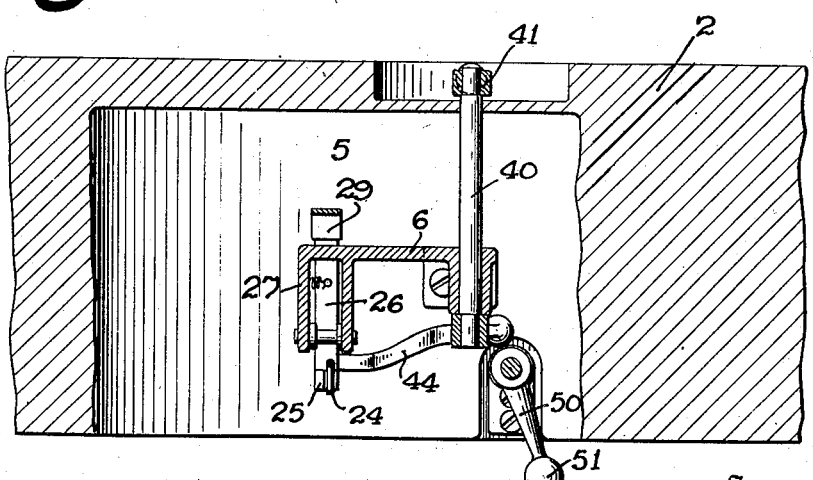
Fig. 4 is a horizontal cross-section on the line 4—4 of Fig. 5 through the same part of the door and shows in plan a part of the resetting means and the manual devices for permitting the door to be closed without operation of the trip devices and thermostat.

A recess or chamber in the door 2 and extending inwardly and preferably from the front of said door 1 is indicated at 5 (see Figs. 3, 4 and 5) and within said cavity or chamber is secured a frame 6 carrying members of the releasing mechanism and resetting devices therefor as will be presently described.

Figure 2:
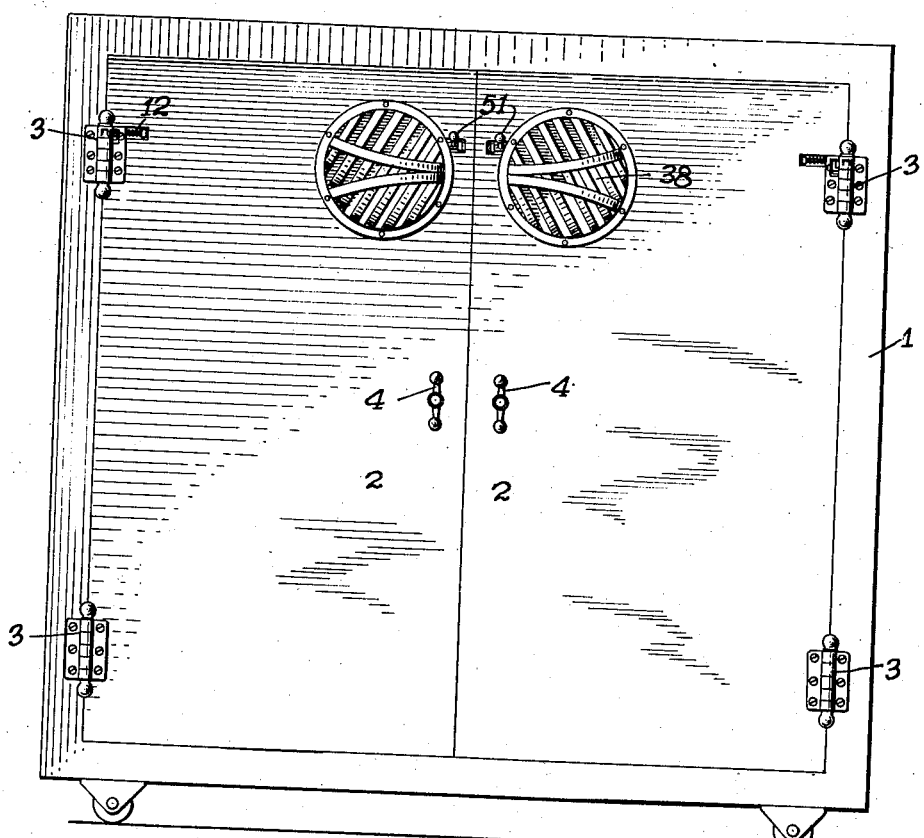

At 7 is shown a suitable rock shaft rocking in bearings 8 and 9 and extending preferably horizontally with one of its ends located near the hinged edge of the door, as shown in Figs. 2, 9 and 10. The bearing 8 is preferably fastened in a recess extending laterally from a wall of the chamber or cavity 5 while the bearing 9 at the further end of said shaft is secured within a cavity formed in the face of the door at the hinged edge. Said rock shaft carries an arm 10, at the free end of which outside the door is provided a dog 11. A spring 12 is applied to the rock shaft in a manner to give bias to the shaft, tending to rock the same in a direction to hold the dog 11 up in position where it interlocks with a suitable stop, which is preferably on one of the fixed knuckles 13 of the spring hinge, when the door is swung open to the desired extent. The position shown in dotted lines Fig. 9 indicates the door as swung half way open but obviously the stop might be so placed as to be engaged by the dog when the door is fully open. The stop may be formed by an edge or shoulder of a notch 13' in the face of a hinge knuckle on the surface of which the dog may ride as the door is swung back to the position shown in dotted lines. On reaching the position of the notch the dog will spring into the notch automatically by a sidewise movement produced by the action of a suitable spring 12. Preferably this spring action is produced by the same spring 12 which tends to turn the shaft 7 and in this case is applied to the parts in such way as not only to exert a turning force on the shaft tending to hold the dog lifted but to also move the support of the dog axially of the shaft. For this purpose the dog carrying arm 11 may be mounted on a sleeve 11' which is connected to the shaft by a spline permitting limited movement of the arm on the shaft axially of said shaft while at the same time communicating the rocking movement of the shaft to the arm. The spring 12 being confined between the sleeve and the shaft bearing produces the axial movement and causes the dog to enter the notch. At the bottom of the notch is a cam or incline as shown, leading outwardly toward the surface of the knuckle so that when the dog is forced downwardly by the action of the release mechanism upon the rock shaft 7, as will be presently described, the dog will be moved away from engagement with the edge of the notch and into position where it will ride without obstruction upon the unbroken surface of the knuckle as the parts turn around the axis of the hinge in the closing movement of the door.

The rock shaft also carries an arm 14 extending therefrom inwardly into position over an operating arm 15 constituting the striker arm of a weighted striker the weight of which is indicated at 16. Said striker is mounted to swing or rock in a bearing 17 on frame 6 or other suitable support and is normally detained or held against movement by a suitable detent mechanism thermostatically controlled as will be presently described. When the striker is released the weight throws the striker arm 15 up against the rocker arm 14 and rocks the shaft 7 in a direction to free the dog 11 from its stop thereby permitting the door to close. The shaft which carries the striker and turns in the bearing 17 is indicated at 18 and may be considered as the main or master shaft of the thermostatically controlled mechanism which normally restrains said shaft from turning under the influence of the weight 16 until a latch or catch 19 carried by the striker is freed from the restraint of detent 20.

Figure 6:
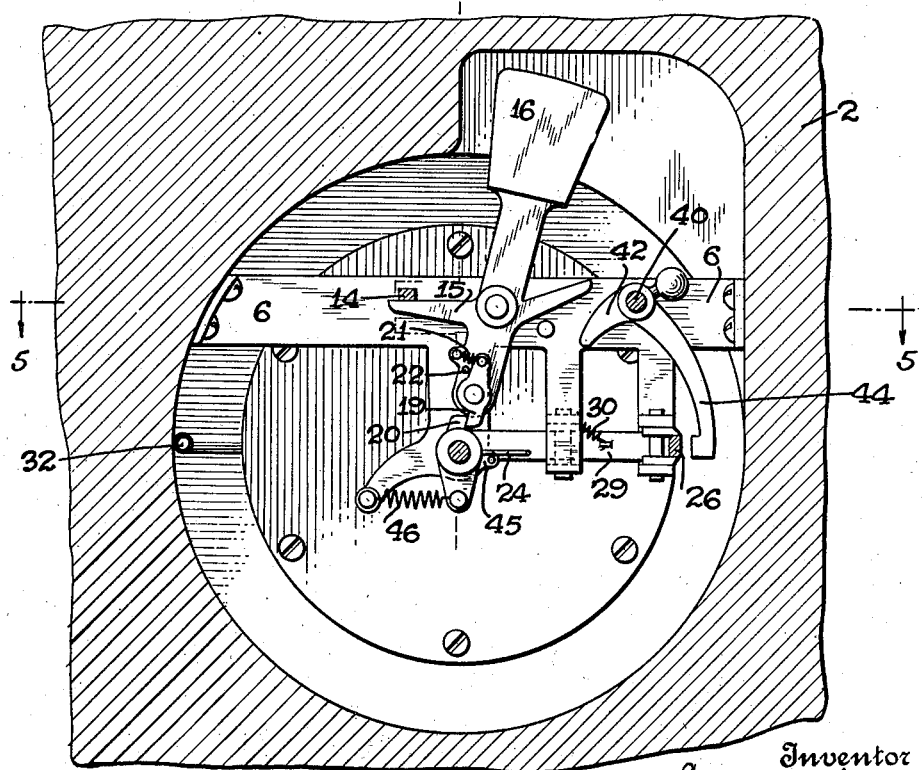
Fig. 6 is a vertical section on the line 6—6 of Fig. 5.

The latch or catch 19 is preferably a pivoted latch or dog pivoted on an arm of the striker and provided with a spring 21 and stop 22. The latter holds the pivoted latch or dog 19 from turning when it is interlocked with the detent 20 as illustrated in Fig. 6 so that the striker will be held from movement so long as the stop or detent 20 is prevented from turning by the engagement therewith of the latch or catch 19 carried by the weighted striker. After release of the striker causing the latch to pass to position shown in Fig. 8, the striker can be reset or turned back to locking or stopping position without interference from interengagement of the latch or detent since in this movement the pivoted member of the latch may ride freely over the detent in an obvious manner.

Detent 20 is mounted to turn on a fixed center 23 secured to an arm of the frame 6 and is provided with a secondary detent arm 24 extending into position beneath the toe or projection 25 of a secondary detent lever 26 suitably pivoted in a depending bracket 27 depending from frame 6. A spring 28 applied to lever 26 tends to turn the same in a direction to draw the toe or detent 25 from position for interlocking engagement with detent arm 24. Said detent arm 26 however is normally held against turning when the apparatus is set, by means of a latch or catch 29 also pivoted on the frame 6 and held normally by a spring 30 in position to be engaged by and to lock the lever 26 against movement by its spring. The latch 29 is actuated by any suitable thermostat which is preferably constructed as follows:

At 30' is shown a metal air-containing chamber fastened over the front of the cavity or space 5 by brackets 31 or by other suitable means. Said chamber communicates by a conduit or pipe 32 with a sealed space at the back of a diaphragm 33. Said diaphragm is suitably fastened at its edge between the edges of a hard rubber or other casing 34 which in turn is secured at the bottom of the chamber 5 by suitably fastened bolts or screws extending through from the inside of the door as indicated at 35 Fig. 3. The diaphragm 33 carries an operating pin 36 projecting through the wall of casing 34 into position to engage the free end of the latch 29 as shown best in Fig. 5. While any fluid having a high co-efficient or rate of expansion when heated may be used in the chamber 30', it is preferable to employ air and to provide the chamber 30' with an air vent such as is indicated at 37. Said vent is of restricted size to prevent the air when expanding to escape at a limited rate when the temperature rises, so that as described in my prior Patent No. 1,269,556, dated June 11, 1918, pressure will not accumulate in the chamber to a sufficient degree to actuate the diaphragm 33 and latch 29, unless the temperature rises at a predetermined rate indicating danger conditions requiring that the trip mechanism should operate to release the door and permit it to close.

While it is preferred to operate the latch or trip mechanism to throw the locking dog 11 and release the door by the controlling action of an air thermostat of the character just described, I do not limit myself to that particular construction since it would be within my invention to operate the trip mechanism by the action of any other kind of thermostat operating on the latch or preliminary detent of the trip mechanism. Nor do I limit myself to the particular form of trip mechanism shown for locking shaft 7 carrying the release dog although I prefer to employ the construction shown since it is sensitive in its action and operates with a positive force upon the shaft when automatic action of the same is required owing to the presence of dangerous temperatures threatening the safety of the contents of the safe or other enclosure.

At 38 is indicated a shield or escutcheon preferably ornamental in form which is applied on the front face of the door over the air chamber 30' and cavity 5, said escutcheon protecting the parts against derangement while at the same time permitting free access of heated air to heat the chamber 30' and its contents.

In order to reset the trip mechanism in case it should operate thermostatically or otherwise, I provide a resetting shaft 40 projecting through the rear wall of the door and there provided in a suitable recess with an operating handle 41. Said resetting shaft 40 is mounted in a suitable bearing in the frame 6 and carries a resetting arm 42 adapted, when the shaft is turned by handle 41, to engage with an arm 43 extending from the striker so that after the striker has operated and assumed position such as shown in Fig. 8, it may be turned back to position indicated in Fig. 6 which is the normal or set position. Said shaft 40 also is provided with an arm 44 extending therefrom to engage by its free end with the rear side of the detent lever 26 already referred to, so that said lever 26 may be restored to position for being latched up by the end of latch 29 while at the same time the toe 25 will be brought forward into position over the arm 24 extending from detent shaft 23. In this resetting operation the arm of the striker will be moved to carry the pivoted detent 19 on the end thereof backward from position shown in Fig. 8 and over the detent or projection 20 so that it will automatically assume the position shown in Figs. 6 and 7. A suitable stop pin 45 prevents movement of the arm 24 downwardly during this resetting action while a spring 46 acts on the pivoted member carrying stop or detent 20 and detent arm 24 to restore the arm to engagement with said stop and place it in normal position for being detained by the toe 25 when the same is reset.

As will be understood, the weight 16 and other parts giving a bias to the striker by which it may be caused to engage the arm 14 of the rock shaft is sufficient to overcome the spring 46 when the detent arm 24 is released by the operation of detent lever 26 but as soon as the release of the striker has been effected by the detent 19 slipping by the stop 20 as said stop turns owing to release of arm 24, said arm will be immediately returned to the normal position therefor shown in Fig. 8 by the action of the spring 46.

In addition to the devices already described there is provided proper means adapted for manual operation whereby the door may be freed and allowed to close without operation of the thermostat. In my improved apparatus this may be effected without disturbing the tripping mechanism employed for freeing the dog 11 from engagement with its stop. To secure this result there is attached to the rock shaft 7 an arm 50 terminating in a handle or knob 51 projecting through an opening in the door, whereby the shaft 7 may be turned or rocked in a direction to move the dog 13 downward away from engagement with its stop notch in the knuckle of the hinge. When so moved it is obvious that the door may be permitted to swing shut.

This operation can take place without disturbance of the trip mechanism which may remain set ready to be controlled by the thermostat the next time the door is opened. In this manual release operation the arm 14, which will be engaged by the striker in case of operation of the thermostatic control, will move in a direction away from the striker arm 15 so that, as already stated, the manual operation may be conducted without disturbance of the automatic thermostatically controlled release trip mechanism.

Figure 5:
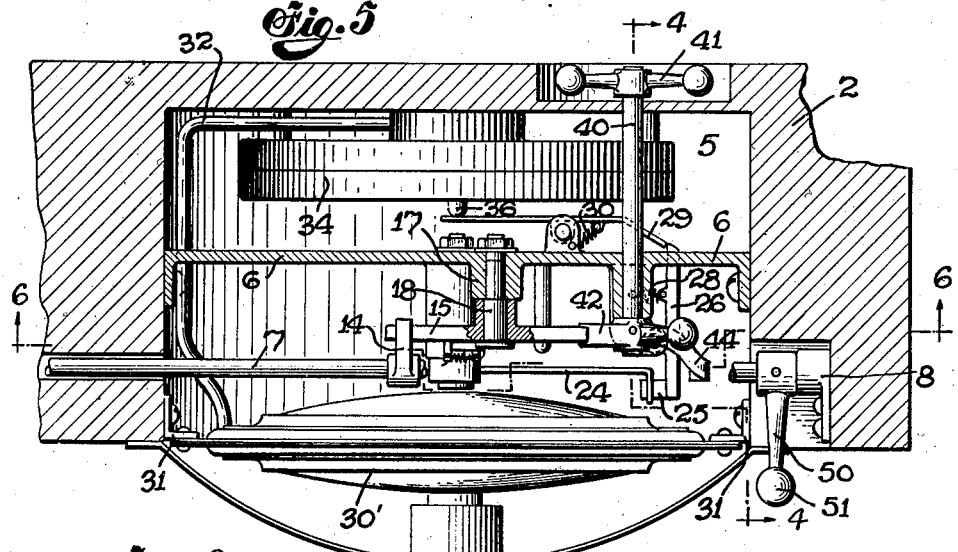
Fig. 5 is a horizontal section through the door on the line 5—5 of Fig. 6 and shows the thermostat and trip devices in plan.
Figure 7:
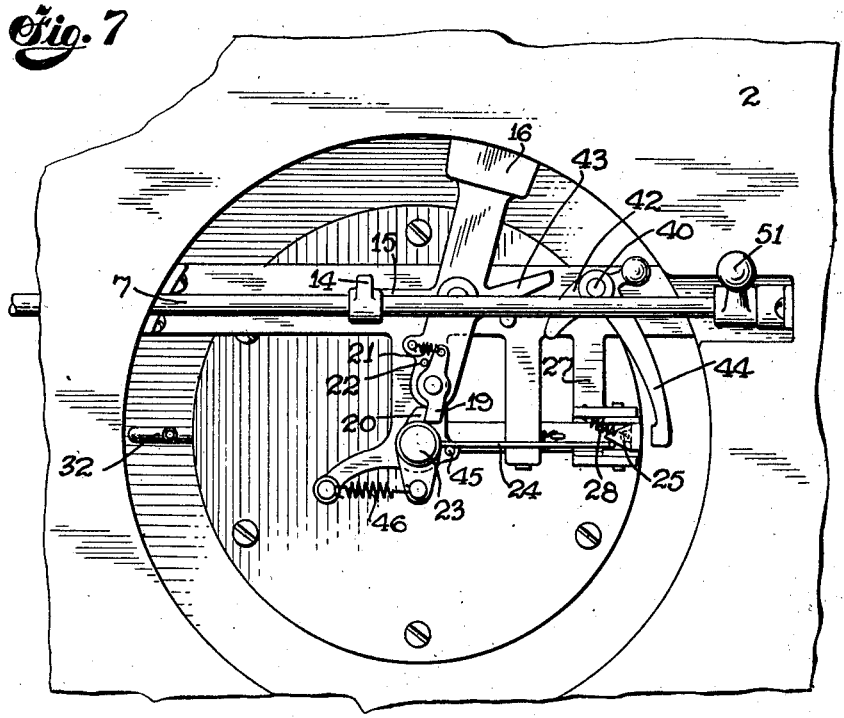
Fig. 7 is an elevation of the trip devices, the thermostat air chamber and shield or escutcheon in the front of the door being removed.
Figure 8:
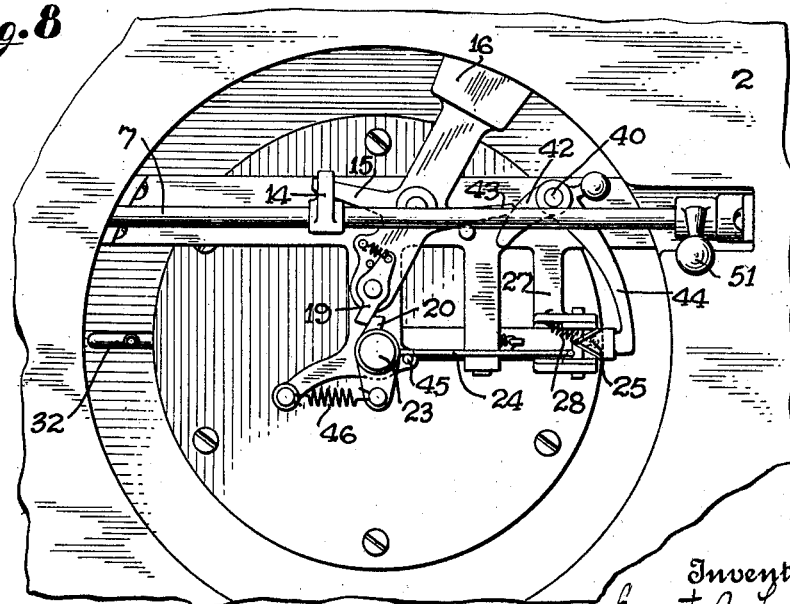
Fig. 8 shows the parts of Fig. 7 in the position they assume after being tripped by the action of the thermostat.

The general operation of the apparatus constructed in accordance with my invention and in the particular form shown and described is as follows:

Assuming that the door 2 is closed and that the trip mechanism has been set by the resetting shaft 4 so that the parts thereof within the chamber 5 will occupy the position shown in Figs. 6 and 7, the striker which engages the rocker arm 14 for the purpose of turning the rock shaft 7 will be held from turning by the action of the weight 16 owing to the fact that the pivoted dog or catch 19 carried thereby engages and is interlocked with the detent 20, while the latter is prevented from turning counter-clockwise to free the dog 19 owing to the fact that the arm 24 carried by said detent 20 is engaged beneath the toe or projection 25 of the lever 26 and the latter lever is prevented from turning under the action of its own spring in a direction to free the arm 24 owing to the fact that said lever 26 engages the end of the latch 29 held in position shown in Fig. 5 by its own spring 30.

When the door is opened by means of the handle 4 or other means and swings on its hinges 3, the dog 13, which in the closed position of the door engages, as shown in Fig. 9, with the surface of the hinge knuckle, will now ride in the arc of a circle on the curved outer surface of said knuckle until it reaches coincidence with the locking notch 13' in the outer surface of said knuckle as already described. The locking notch may be located in position to be reached by the dog 11 when the door is partially or fully opened. When the dog reaches the notch it springs into the same under the action of the spring 12 which tends to move the collar 11' and arm 10 of the dog axially on the rock shaft 7. This movement of the door and of the locking dog is accomplished without interference with or from the trip mechanism, since there is no positive connection of the rock shaft or parts carried thereby with said trip mechanism, although the striker arm 15 retains its operative relationship to the arm 14 of the rock shaft and is ready to turn the rock shaft in its bearings whenever the striker may be released. By engagement of the dog in the notch the door is held open against the action of the spring hinge or other means tending to close the same thus allowing free access to the safe so long as desired. During business hours deposit or withdrawal of the files or papers which in the case of a filing cabinet may require frequent use and which should be readily accessible at all times, may now take place without it being necessary to close the safe whenever a file is withdrawn in order to protect the contents from damage by fire.

If fire danger conditions arise the thermostat will act and will cause the latch 29 to be actuated thus freeing the detent arm 24. The weight 16 of the striker will now no longer be held out of action by the interlocking of the catch 19 with the dog 20 carrying detent arm 27 owing to the fact that the detent 20 may turn on its center under the action of said weight and carry the dog 19 past position of interengagement with said detent. The weight 16 therefore turns the striker, and the arm 15 by its engagement with the under side of the rocker arm 14 turns the rock shaft in opposition to the turning effect of spring 12 and swings the dog 11 downwardly so that it rides upon the incline below the notch and is carried thereby into position to engage the unbroken or smooth periphery of the knuckle. As soon as this occurs the dog, being no longer interengaged with the notch, is moved around by the action of the spring of the hinge which moves the door and said dog rides on the unbroken periphery of said knuckle until the door is fully closed. When the dog reaches the notch in the opening movement of the door and springs into the same, it is held up in the notch so that it cannot become disengaged by riding on the cam, owing to the fact that the spring 12 exerts a turning influence on the shaft 7 tending to keep the dog lifted.

The striker having been released to free the door and allow it to close, will assume the position indicated in Fig. 8 and the detent arm 24 will have fallen to position shown in that figure under the action of its spring 46 as soon as the pivoted dog 19 escapes by the detent 20. The arm 24 will now rest upon the stop 45 while its hooked extremity will rest in position such that when the detent lever of the trip mechanism is reset by the operation of the resetting shaft 40, the toe 25 of said lever will pass over the end of the detent arm 24 and prevent the same from rising under the action of the weight 16, the latter together with the striker arms having been in the meantime returned by the operation of the arm 42 of the resetting shaft to position shown in Fig. 7. In this operation the pivoted latch 19 will freely pass over the detent 20 and assume position shown in Fig. 7 owing to the fact that it is loosely pivoted on the striker to allow free movement of the dog clockwise.

Said dog acts to hold the striker however from turning owing to the fact that it cannot perform any counter-clockwise movement by reason of the engagement of said pivoted dog with the stop pin 22 on the striker arm.

Should the automatic release under thermostatic action not take place when the door is open, it may be readily closed by simply turning the rock shaft by means of the operating handle 51 in a direction to carry the dog down out of the notch and away from the same by action of the cam beneath the notch so that it may ride upon the outer surface of the knuckle as the door closes under manual control assisted by operation of the spring hinge.

The operation of the rock shaft manually obviously can take place without interfering with the trip mechanism since the arm 14 is simply lifted in a direction away from the striker arm 15 as the rock shaft turns to cause the dog-carrying arm on the other side of the shaft to be depressed out of the notch. Should the trip mechanism have operated automatically to close the door, said door may be opened without interference and the trip mechanism reset by operating the shaft 40 from the inside of the door.

As will be obvious, in my invention the mechanism is almost completely concealed in the door excepting for the projection of the handle 51 and the small locking dog. The hood or escutcheon may be made ornamental and at the same time being perforated, will not interfere with the free action of the thermostatic devices which bring about the automatic release.

I do not limit myself to the use of my invention for thermostatically releasing safe doors to close the door since the mechanism described may be usefully employed for other doors and for either closing or opening the same.

What I claim as my invention is:—

1. In an apparatus of the character described, the combination with an enclosure forming one member and a door forming another member and adapted to close an opening in the first named member under the action of a spring or other power, of a dog pivotally mounted on one member near the hinged edge of the door and a stop on the other member with which the dog engages to hold the door open, and thermostatically controlled means mounted on one of said members and adapted to operate the dog and release it from the stop thereby permitting the door to close.

2. In an apparatus of the character described, the combination with an enclosure and a door therefor, of a pivotally mounted dog projecting through the face of the door near its hinged edge, a stop on the hinge with which the dog automatically engages when the door is opened to prevent the same from closing, a spring tending to close the door and thermostatically controlled means for operating said dog to release the door.

3. In an apparatus of the character described, the combination with a door, of a rock shaft within the door, a dog projecting from the door at its hinged edge and carried by said rock shaft, a stop on the hinge with which the dog engages in the open position of the door and thermostatically controlled means mounted on the door for operating the rock shaft to free the dog from the stop.

4. In an apparatus of the character described, the combination of a rock shaft having a projecting arm carrying a dog for interlocking engagement with a stop whereby the door is held open, an arm projecting from said rock shaft, a pivoted striker adapted to strike said arm and thermostatically controlled means normally holding said striker out of striking engagement and adapted to free the striker on abnormal rise of temperature affecting the thermostat.

5. In an apparatus of the character described, the combination of a thermostatically controlled weighted master shaft, a striker arm extending therefrom, a spring-actuated rock shaft having an arm adapted to be engaged by the striker, a hinged member carrying the rock shaft and a dog mounted on the rock shaft and adapted to automatically interlock with a stop when the member carrying the rock shaft is swung on its hinge.

6. In an automatic thermostatic release for hinged doors, the combination of a thermostatically controlled biased rock shaft provided with a dog and a stop on a knuckle of the hinge, said dog being adapted to automatically interlock with the stop on the knuckle when the door is opened.

7. In an apparatus of the character described, the combination of a weighted striker, a trip mechanism for releasing the striker, a thermostat controlling said trip mechanism and a resetting shaft having two arms one adapted to engage an arm of the striker and the other adapted to engage an element of the trip mechanism to reset the same to position for holding the striker in reset position.

8. In an apparatus of the character described, the combination with a dog and stop therefor, of a striker, a door carrying said striker in a recess therein, thermostatically controlled release mechanism mounted in said recess for freeing the striker and a resetting shaft extending through a wall of said recess and provided with means for resetting the striker and the release mechanism.

9. In an apparatus of the character described, the combination of a hinged door, a spring tending to close the door, a thermostatically controlled rock shaft and a pivotally mounted dog and cooperating stop adapted to automatically interlock when the door is swung open and to hold the same in open position, one of said dog and stop members being upon the door hinge, actuating means for operating the dog to free the door and thermostatically controlled trip mechanism for releasing said actuating means.

10. In an apparatus of the character described, the combination of a door, a spring hinge therefor, a rock shaft, a thermostatically controlled trip mechanism mounted on the door for operating the shaft and a dog carried by the shaft and interlocking with a knuckle of the hinge to hold the door open.

11. In an apparatus of the character described, the combination of a hinged member, a rock shaft, an arm carrying a dog, a stop with which the dog may interlock automatically to hold the rock shaft supporting member against movement, a spring acting on the rock shaft to hold the dog at an interlocking position and thermostatically controlled means for turning the rock shaft against the action of its spring to free the dog and allow movement of the hinged member.

12. In an apparatus of the character described, the combination with a hinged door, of a dog supporting rock shaft within the door and extending transversely and having a dog projecting through an opening in the face of the door near the hinged edge, thermostatically controlled trip mechanism mounted in a recess in the door, means connected therewith for operating the rock shaft to free the dog from its stop and manual means for turning the rock shaft independently of the trip mechanism to allow the door to close without action of said trip mechanism.

13. In an apparatus of the character described, the combination with a thermostatically controlled rock shaft mounted in the door, a dog projecting from the face of the door near its edge, a stop with which said dog automatically interlocks when the door is opened to a predetermined extent, thermostatically controlled trip mechanism, a striker adapted to be freed by the action of said trip mechanism and engaging an arm of the rock shaft to rock the same and free the dog, and a manual operating arm projecting through an opening in the face of the door and carried by said rock shaft.

14. In an apparatus of the character described, the combination of a door, a locking dog adapted to lock the door in open position, a trip mechanism mounted in a recess in the face of the door and an air thermostat having a closed air chamber mounted on one face of the door over said chamber, a perforated escutcheon therefor, a latch for the trip mechanism and an operating diaphragm secured in the bottom of the recess and operated by pressure of air conveyed through a suitable pipe from the air chamber to the space back of said diaphragm.

15. In an apparatus of the character described, the combination with a door and a locking dog for holding the door in open position, a thermostatically controlled trip mechanism mounted on a frame supported within a recess in the face of the door, a thermostat having an air chamber closing the front of said recess, a latch actuating diaphragm at the bottom of said recess connected by a pipe with said air chamber and a resetting shaft extending from the rear of the door into said recess.

16. In an apparatus of the character described, the combination with a safe door, of an automatic thermostatically released trip mechanism mounted in a cavity in the face of the door and a perforated escutcheon applied over said opening to enclose and conceal the mechanism while allowing free access of heated air to the thermostat.

17. In an apparatus of the character described the combination of a door, a stop, a dog cooperating with the stop to hold the door against movement, a striker for actuating the dog to free the door, detent mechanism normally holding said striker from action and a thermostat for freeing said detent mechanism to bring about the operation of the striker.

Signed at New York in the county of New York and State of New York this 4th day of February A. D. 1925.

ERNEST A. LOWE.